(12) United States Patent
Koster et al.

(10) Patent No.: US 10,250,496 B2
(45) Date of Patent: Apr. 2, 2019

(54) ROUTER BASED MAXIMUM TRANSMISSION UNIT AND DATA FRAME OPTIMIZATION FOR VIRTUALIZED ENVIRONMENTS

(71) Applicant: International Business Machines Corporation, Armonk, NY (US)

(72) Inventors: David M. Koster, Rochester, MN (US); Jason A. Nikolai, Rochester, MN (US); Adam D. Reznechek, Rochester, MN (US); Steven E. Royer, Rochester, MN (US); Andrew T. Thorstensen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 15/419,808

(22) Filed: Jan. 30, 2017

(65) Prior Publication Data
US 2018/0219772 A1 Aug. 2, 2018

(51) Int. Cl.
| H04L 1/00 | (2006.01) |
| H04L 12/713 | (2013.01) |
| H04L 12/805 | (2013.01) |
| H04L 12/721 | (2013.01) |
| H04L 12/46 | (2006.01) |
| G06F 9/455 | (2018.01) |

(52) U.S. Cl.
CPC ........ *H04L 45/586* (2013.01); *G06F 9/45558* (2013.01); *H04L 12/4641* (2013.01); *H04L 45/66* (2013.01); *H04L 47/36* (2013.01); *G06F 2009/45579* (2013.01); *G06F 2009/45595* (2013.01)

(58) Field of Classification Search
CPC ... H04L 45/586; H04L 12/4641; H04L 45/66; H04L 47/36; G06F 9/45558; G06F 2009/45595; G06F 2009/45579
See application file for complete search history.

(56) References Cited

U.S. PATENT DOCUMENTS

| 7,831,739 B2 | 11/2010 | Lambeth et al. |
| 8,549,187 B1 | 10/2013 | Christopher et al. |
(Continued)

OTHER PUBLICATIONS

© 2016 Microsoft, "How to: Change the Default Maximum Transmission Unit (MTU) Size Settings for PPP Connections or for VPN Connections", retrieved Dec. 7, 2016, 8 pages <https://support.microsoft.com/en-us/kb/826159>.

(Continued)

*Primary Examiner* — Clemence S Han
(74) *Attorney, Agent, or Firm* — Patterson + Sheridan, LLP (57) ABSTRACT

Systems, methods, and computer program products to perform an operation comprising receiving a first data frame and a second data frame by a device driver of a first virtual network interface controller (vNIC) of a plurality of vNICs sharing a physical network interface controller (NIC) of a computing system, storing, by the device driver of the first vNIC, the first and second data frames in a first queue for the first vNIC, generating, by the device driver of the first vNIC, an optimized data frame comprising the first and second data frames, wherein the optimized data frame specifies a modified Ethernet preamble, and sending the optimized data frame to a hypervisor of the computing system.

20 Claims, 7 Drawing Sheets

(56) References Cited

U.S. PATENT DOCUMENTS

| | | | |
|---|---|---|---|
| 9,037,719 B2 | 5/2015 | Shen et al. | |
| 9,612,877 B1* | 4/2017 | Noll | G06F 9/5077 |
| 2012/0151473 A1* | 6/2012 | Koch | G06F 9/45558 |
| | | | 718/1 |
| 2012/0158887 A1 | 6/2012 | Tsirkin | |
| 2013/0061224 A1 | 3/2013 | Reumann et al. | |
| 2015/0085665 A1* | 3/2015 | Kompella | H04L 47/2483 |
| | | | 370/236 |
| 2015/0195137 A1 | 7/2015 | Kashyap et al. | |
| 2017/0161090 A1* | 6/2017 | Kodama | G06F 9/45558 |

OTHER PUBLICATIONS

© 2016 Belkin International, Inc. Linksys, Max-Stream and Performance Perfected, "Determining and setting up the correct MTU size", retrieved Dec. 7, 2016, 14 pages <http://www.linksys.com/us/support-article?articleNum=134914>.

Gite, V. "Linux MTU Change Size", retrieved Dec. 7, 2016, 10 pages <http://www.cyberciti.biz/faq/centos-rhel-redhat-fedora-debian-linux-mtu-size/>.

* cited by examiner

ROUTER BASED MAXIMUM TRANSMISSION UNIT AND DATA FRAME OPTIMIZATION FOR VIRTUALIZED ENVIRONMENTS

BACKGROUND

The present invention relates to virtualized environments, and more specifically, to providing router-based maximum transmission unit and data frame (or packet) optimization in virtualized environments.

In virtualized environments, multiple software actors may share access to the same physical hardware. For example, a plurality of virtual machines may execute on a single physical host machine, sharing the physical resources provided by the host machine. One example of such a physical resource is a network interface device. As such, virtual machines executing on the host machine are each assigned one or more virtual network interface devices that manage network communications on behalf of the virtual machines and any corresponding software components executing therein. The hypervisor of the host machine orchestrates sharing of the physical network interface device by the virtual network interface device. In order for the hypervisor to send a data frame received from the virtual network interface devices out via the physical network interface device, the virtual network interface device must copy the frame to a trunk Ethernet device of the hypervisor. Doing so involves system calls to the hypervisor, and requires the processor of the host machine to change states, each of which are very inefficient, and reduce overall system performance.

SUMMARY

In one embodiment, a method comprises receiving a first data frame and a second data frame by a device driver of a first virtual network interface controller (vNIC) of a plurality of vNICs sharing a physical network interface controller (NIC) of a computing system, storing, by the device driver of the first vNIC, the first and second data frames in a first queue for the first vNIC, generating, by the device driver of the first vNIC, an optimized data frame comprising the first and second data frames, wherein the optimized data frame specifies a modified Ethernet preamble, and sending the optimized data frame to a hypervisor of the computing system.

In another embodiment, a system comprises a processor and a memory storing instructions, which when executed by the processor, performs an operation comprising receiving a first data frame and a second data frame by a device driver of a first virtual network interface controller (vNIC) of a plurality of vNICs sharing a physical network interface controller (NIC) of a computing system, storing, by the device driver of the first vNIC, the first and second data frames in a first queue for the first vNIC, generating, by the device driver of the first vNIC, an optimized data frame comprising the first and second data frames, wherein the optimized data frame specifies a modified Ethernet preamble, and sending the optimized data frame to a hypervisor of the computing system.

In another embodiment, a computer-readable storage medium has computer-readable program code embodied therewith, the computer-readable program code executable by a processor to perform an operation comprising receiving a first data frame and a second data frame by a device driver of a first virtual network interface controller (vNIC) of a plurality of vNICs sharing a physical network interface controller (NIC) of a computing system, storing, by the device driver of the first vNIC, the first and second data frames in a first queue for the first vNIC, generating, by the device driver of the first vNIC, an optimized data frame comprising the first and second data frames, wherein the optimized data frame specifies a modified Ethernet preamble, and sending the optimized data frame to a hypervisor of the computing system.

DETAILED DESCRIPTION

Embodiments disclosed herein provide a new type of data frame (e.g., an Ethernet frame) that is transferred between the virtual network adapters of virtual machines and hypervisors of host machines. Generally, instead of immediately sending a data frame from the virtual machine to the hypervisor (or vice versa), the device driver of the virtualized network adapters add the frame to a queue of a predefined size. Once the queue is full, the device driver sends each frame in the queue as a single, optimized data frame. Once received, the device driver extracts each frame in the optimized data frame for forwarding to the appropriate destination (e.g., a physical network interface device for frames received by the device driver of the hypervisor, and software components for frames received by the device driver of the virtual machine).

By configuring the device drivers in such a fashion, applications remain completely unaware of the modifications being made, and do not have to be reconfigured to support these techniques. Since the original frame is kept intact in its entirety, the techniques disclosed herein have no impact on any internal (e.g., applications, routing tables, etc.) or external systems (e.g., networking devices on the Internet, recipient computing devices, recipient applications, etc.).

Figure 1:
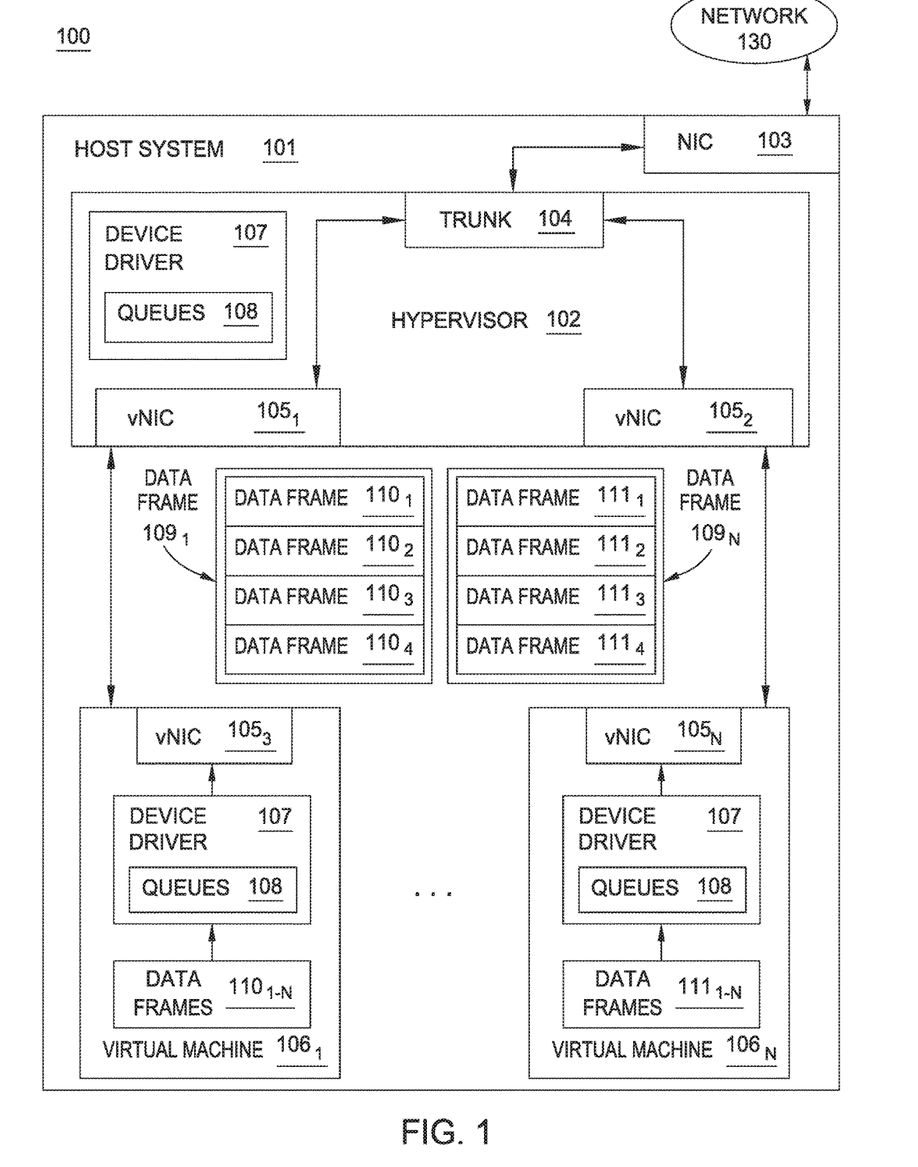
FIG. 1 illustrates an example system architecture which provides router-based maximum transmission unit and data frame optimization in virtualized environments, according to one embodiment.

FIG. 1 illustrates an example system architecture 100 which provides router-based maximum transmission unit and frame optimization in virtualized environments, according to one embodiment. As shown, the system 100 includes a host system 101, which is a physical computing system which supports virtualized computing by hosting a plurality of virtual machines $106_{1-N}$ that execute on shared hardware such as processors, memory, and the network interface controller (NIC) 103. As shown, the host system 101 includes a hypervisor 102, which provides operating system functionality (e.g., process creation and control, file system process threads, etc.) as well as CPU scheduling and memory management for the virtual machines $106_{1-N}$ managed by hypervisor 102. Generally, a virtual machine is an emulation of a computer system (e.g., the host system 101) which provides the functionality of a physical computer. Each virtual machine $106_{1-N}$, therefore, executes a respective operating system and set of applications (not pictured).

The NIC 103 is a hardware component that connects the host system 101 to other computing systems via the network 130. While a single NIC 103 is depicted, the system 101 may include any number of NICs 103. As shown, the hypervisor 102 includes two virtual NICs (vNIC) $105_{1-2}$ and virtual machines $106_{1-N}$ include vNICs $105_{3-N}$, respectively. The hypervisor 102 and/or virtual machines $106_{1-N}$ may include any number of vNICs 105. Generally, a vNIC is a virtualized (or abstract) representation of the NIC 103, and facilitates communication between the virtual machines $106_{1-N}$. Similarly, using a vNIC 103, a given virtual machine $106_{1-N}$ may communicate with other computing systems via the network 130 (or other networks).

For example, as shown, the virtual machines $106_{1-N}$ generate data frames $110_{1-N}$ and $111_{1-N}$, respectively. Traditionally, the virtual machines $106_{1-N}$ transmit each data frame $110_N$, $111_N$ serially to the hypervisor 102. If, for example, the virtual machine $106_1$ needed to send data frame $110_1$ to a computing device via the network 130, the device driver 107 of the virtual machine $106_1$ would send the data frame $110_1$ to the vNIC $105_1$ of the hypervisor 102 via the vNIC $105_3$. The hypervisor 102 would then copy the data frame $110_1$ to a trunk Ethernet device 104 of the hypervisor 102. The trunk Ethernet device 104 (also referred to as a shared Ethernet adapter) is a virtual input/output (I/O) component that bridges the physical NIC 103 and the vNICs $105_{1-N}$. Once copied to the trunk Ethernet device 104, the data frame $110_1$ is forwarded to the network 130 via the NIC 103. However, copying the data frame $110_1$ to the trunk Ethernet device 104 requires the processor of the system 101 to transition between states, which leads to inefficient system performance, and an inability of the system 101 to use the full bandwidth of the NIC 103.

Advantageously, however, embodiments disclosed herein provide a new, optimized data frame (e.g., the data frames $109_{1,2}$) that are transmitted between the hypervisor 102 and virtual machines $106_{1-N}$. As shown, the optimized data frames $109_{1,2}$ are comprised of data frames $110_{1-N}$ and $110_{1-N}$, respectively. In at least one embodiment, the data frames 109-111 are Ethernet frames, respectively. However, any use of Ethernet herein should not be considered limiting of the disclosure, as the techniques of the disclosure apply equally to other types of media access control (MAC) technologies.

Generally, when an application and/or operating system of the virtual machines $106_{1-N}$ generates a data frame $110_{1-N}$, $111_{1-N}$ the device drivers 107 of the vNICs $105_{3-N}$ receive the frames $110_{1-N}$, $111_{1-N}$. A device driver is a software component that controls the operation of the vNICs 105 (and in the case of the hypervisor 102, the device driver 107 also controls the trunk 104). However, instead of immediately (and serially) sending the data frames $110_{1-N}$, $111_{1-N}$ to the hypervisor 102, the device drivers 107 add the data frames $110_{1-N}$, $111_{1-N}$ to a respective queue 108. The queues 108 are data structures of a predefined size. In at least one embodiment, the sizes of the queues 108 are defined to be the maximum size allowed for a data frame by the hypervisor 102. One example of a maximum allowed frame size is 64 kilobytes (KB). In one embodiment, the queues 108 are representative of a send queue and a receive queue in the virtual machines $106_{1-N}$. In the hypervisor 102, the queues 108 are representative of a send queue and receive queue for each virtual machine $106_{1-N}$.

Once a given send queue 108 in the virtual machines $106_{1-N}$ is full, the device driver 107 sends the contents of the queue 108 as a single data frame to the vNICs $105_{1,2}$ of the hypervisor 102 via the respective vNICs $105_{3-N}$. As shown, for example, vNIC $105_3$ sends the optimized data frame $109_1$ to vNIC $105_1$ of the hypervisor 102. The optimized data frame $109_1$ includes data frames $110_{1-4}$. Similarly, vNIC $105_N$ sends optimized data frame $109_N$ to vNIC $105_2$ of the hypervisor 102. The optimized data frame $109_N$ includes data frames $111_{1-4}$. The device driver 107 in the hypervisor 102 may then stream the data frames $110_{1-4}$ and $111_{1-4}$ out one by one to the hypervisor 102.

Similarly, when the device driver 107 of the hypervisor 102 receives data frames intended for a virtual machine $106_N$ via the NIC 103 and/or trunk 104, the device driver 107 copies the data frames to a receive queue 108 for the corresponding virtual machine $106_N$. Once the receive queue 108 is full, the device driver 107 of the hypervisor 102 sends the contents of the queue 108 as an optimized data frame 109 to the vNIC $105_N$ virtual machine $106_N$. Therefore, embodiments disclosed herein leverage queues 108 in the hypervisor 102 and the virtual machines $106_{1-N}$ to generate optimized data frames $109_{1-N}$ that can be sent in both directions between the hypervisor 102 and virtual machines $106_{1-N}$. Doing so greatly reduces the number of processor transitions needed between the virtual machines $106_{1-N}$ and the hypervisor 102, which improves performance of the system 101. Furthermore, because the data frames $110_{1-N}$-$111_{1-N}$ are kept intact in their entirety, transmitting the optimized data frames $109_{1-N}$ means components of the system 101 (and external to the system 101) are not impacted. Furthermore, by providing the functionality of the disclosure in the device drivers 107, applications and operating systems executing on the system 101 are unaware of any changes.

To implement the techniques disclosed herein, the device driver 107 of given virtual machine $106_N$ must negotiate capabilities with the device driver 107 of the hypervisor 102 to determine that the optimized data frames $109_{1-N}$ are supported. Generally, the negotiation involves a device driver 107 of a virtual machine $106_N$ sending a negotiation frame with a predefined preamble that is different than the standard Ethernet preamble. If the device driver 107 of the hypervisor 102 does not support the optimized data frames $109_{1-N}$, the device driver 107 of the hypervisor 102 would drop the negotiation frame because the predefined preamble is not supported. If the device driver 107 of the hypervisor 102 supports the optimized data frames $109_{1-N}$, the device driver 107 of the hypervisor 102 stores the MAC address of the sender and the maximum transmission unit (MTU) specified in the negotiation frame. The device driver 107 of the hypervisor 102 then creates queues 108 for the requesting virtual machine $106_N$, and sends a data frame with the predefined preamble back to the device driver 107 of the requesting virtual machine $106_N$. Doing so informs the requesting device driver 107 of the virtual machine $106_N$ that the optimized data frames $109_{1-N}$ are supported. Once the device driver 107 of the virtual machine $106_N$ receives the data frame with the predefined preamble from the device driver 107 of the hypervisor 102, the device driver 107 of the virtual machine $106_N$ creates the appropriate queues 108. If, however, a virtual machine $106_N$ and/or the hypervisor 102 does not support the optimized data frames $109_{1-N}$, the traditional methods of frame processing are used.

Once the device drivers 107 of the hypervisor 102 and the virtual machines $106_{1-N}$ have negotiated the ability to support the optimized data frames $109_{1-N}$, the device drivers 107 can queue data frames $110_{1-N}$, $111_{1-N}$ using the queues 108 before sending the optimized data frames $109_{1-N}$ via the vNICs $105_{1-N}$. Generally, the optimized data frames $109_{1-N}$ have a new frame type, with a predefined Ethernet preamble, different than the standard Ethernet preamble. Doing so distinguishes the optimized data frames $109_{1-N}$ from traditional Ethernet data frames (e.g., the data frames $110_{1-N}$ and $111_{1-N}$). Otherwise, the structure of the data frames $109_{1-N}$ remains the same as a standard Open Systems Interconnection (OSI) layer 2 data frame. The header portion of such OSI layer 2 data frames include a length field (also commonly referred to as an Ethertype field). When generating an optimized data frame $109_{1-N}$ from data frames $110_{1-N}$, $111_{1-N}$ stored in the queues 108, the device drivers 107 store a length value of the optimized data frames $109_{1-N}$ in the length field of the header. The length value stored in the header of an optimized data frame $109_{1-N}$ is the sum of the lengths of each data frame $110_{1-N}$, $111_{1-N}$ used to create an optimized data frame $109_{1-N}$. For example, if each data frame $110_{1-4}$ depicted in optimized data frame $109_1$ has an MTU of 1500 bytes and a 30 byte header, the length value of optimized data frame $109_1$ would be 1530×4=6120 bytes.

Data frames (or packets) such as the data frames $110_{1-N}$, $111_{1-N}$ can be of variable lengths, or fixed lengths (where each frame is of the same length). If the frames $110_{1-N}$, $111_{1-N}$ are of variable lengths, the device drivers 107 of the virtual machines $106_{1-N}$ place each frame $110_{1-N}$, $111_{1-N}$ in the queue 108 as they are received. The device drivers 107 may then place a pointer or other marker in the queue 108 and/or the optimized data frame $109_N$ to indicate where the next received data frame should be placed. If the buffer 108 becomes full, the device driver 107 sends the optimized data frame $109_N$ via the vNIC $105_{1-N}$ to the vNIC $105_{1-N}$ of hypervisor 102. However, the device drivers 107 also implement a timer that has a maximum time threshold (e.g., 0.1 milliseconds). If the queue 108 is not filled within the maximum time threshold, the device driver 107 sends the optimized data frame $109_N$ with the contents of the queue 108 at the time the time threshold expires. Once received, the device driver 107 of the hypervisor 102, sends the optimized data frame $109_N$ to the hypervisor 102 as a single request. The hypervisor 102 then walks through each data frame $110_{1-N}$, $111_{1-N}$ in the optimized data frame $109_N$, and serially sends each frame $110_{1-N}$, $111_{1-N}$ to the NIC 103.

The device driver 107 of the hypervisor 102 performs the same set of operations when receiving variable-length data frames $110_{1-N}$, $111_{1-N}$ destined for one or more of the virtual machines $106_{1-N}$. However, the device driver 107 of the hypervisor 102 maintains a send queue 108 and a receive queue 108 for the MAC address of each virtual machine $106_{1-N}$. Therefore, the device driver 107 of the hypervisor waits for a given queue 108 to fill before sending the optimized data frame $109_N$ to the recipient virtual machine $106_{1-N}$. For example, if the hypervisor 102 receives data frames from the NIC 103 with a destination of virtual machine $106_1$, the device driver 107 of the hypervisor 102 places the data frames in the send queue 108 for the virtual machine $106_1$. The device driver 107 would then generate and send an optimized data frame 109 to the virtual machine $106_1$ once the send queue 108 for the virtual machine $106_1$ is full, or the corresponding timer elapses.

For fixed-length data frames $110_{1-N}$, $111_{1-N}$, the device drivers 107 adds received data frames $110_{1-N}$, $111_{1-N}$ to the queue 108 that are equal to the MTU size for the corresponding virtual machine $106_{1-N}$. If device driver 107 of the virtual machine $106_{1-N}$ determines that the queue 108 is full, receives a data frame $110_{1-N}$, $111_{1-N}$ that has a size that is less than the MTU size, and/or the maximum time threshold has elapsed, the device driver 107 sends the optimized data frame $109_{1-N}$ to the hypervisor 102. The device driver 107 of the hypervisor 102 then receives the data frame $109_{1-N}$, and uses the MTU size determined during the negotiation phase to extract the constituent data frames $110_{1-N}$, $111_{1-N}$ from the optimized data frame $109_{1-N}$. Generally, the device driver 107 of the hypervisor 102 uses the MTU size to extract the constituent data frames $110_{1-N}$, $111_{1-N}$ without having to inspect each data frame $110_{1-N}$, $111_{1-N}$, as the device driver 107 of the hypervisor 102 knows the size of each data frame $110_{1-N}$, $111_{1-N}$ (until the last data frame $110_{1-N}$, $111_{1-N}$ is reached). Once the last data frame $110_{1-N}$, $111_{1-N}$ is reached, the device driver 107 of the hypervisor 102 computes the size of the last data frame $110_{1-N}$, $111_{1-N}$ using the following equation: Size of data frame $109_N$–(x–1 data frames*MTU size), where the size of optimized data frame $109_N$ is specified in the length field of the header, and x equals the number of data frames $110_{1-N}$, $111_{1-N}$ that have been identified in the optimized data frame $109_N$.

The device driver 107 of the hypervisor 102 performs the same set of operations when receiving fixed-length data frames destined for one or more of the virtual machines $106_{1-N}$ from the NIC 103. The device driver 107 of the hypervisor 102, maintaining queues 108 for each virtual machine $106_{1-N}$, sends the optimized data frames $109_{1-N}$ to the corresponding virtual machine $106_{1-N}$ upon determining one or more of: that the send queue 108 for the corresponding virtual machine $106_{1-N}$ is full, a data frame $110_{1-N}$, $111_{1-N}$ has been received that has a size that is less than the MTU size, and that the maximum time threshold has elapsed. Once received, the device driver 107 of the virtual machine $106_{1-N}$ extracts the data frames $110_{1-N}$, $111_{1-N}$ that make up the optimized data frame $109_{1-N}$.

Figure 2A:
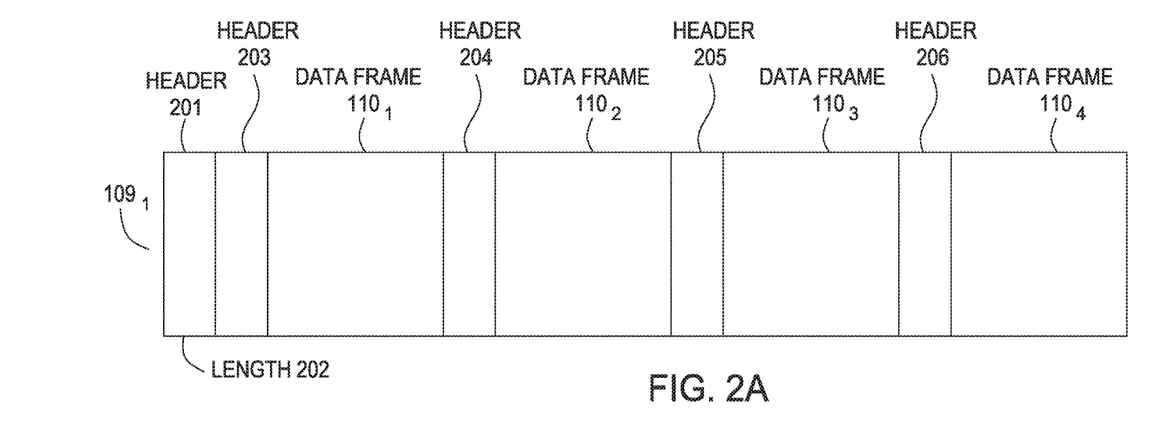
FIGS. 2A-2B depict example optimized data frames, according to various embodiments.

FIG. 2A is a more detailed view of an example optimized data frame $109_1$ from FIG. 1, according to one embodiment. As shown, the example optimized data frame $109_1$ includes a header 201 which is the header of the optimized data frame $109_1$, and includes a length value 202 that specifies the length of the optimized data frame $109_1$. The length value 202 is based on the lengths of each data frame $110_{1-4}$ that make up the optimized data frame $109_1$. As shown, each data frame $110_{1-4}$ includes a respective header 203-206. Therefore, the data frames $110_{1-4}$ are encapsulated in their entirety in the optimized data frame $109_1$. The example optimized data frame $109_1$ reflects an embodiment where the data frames $110_{1-4}$ have fixed lengths.

Figure 2B:
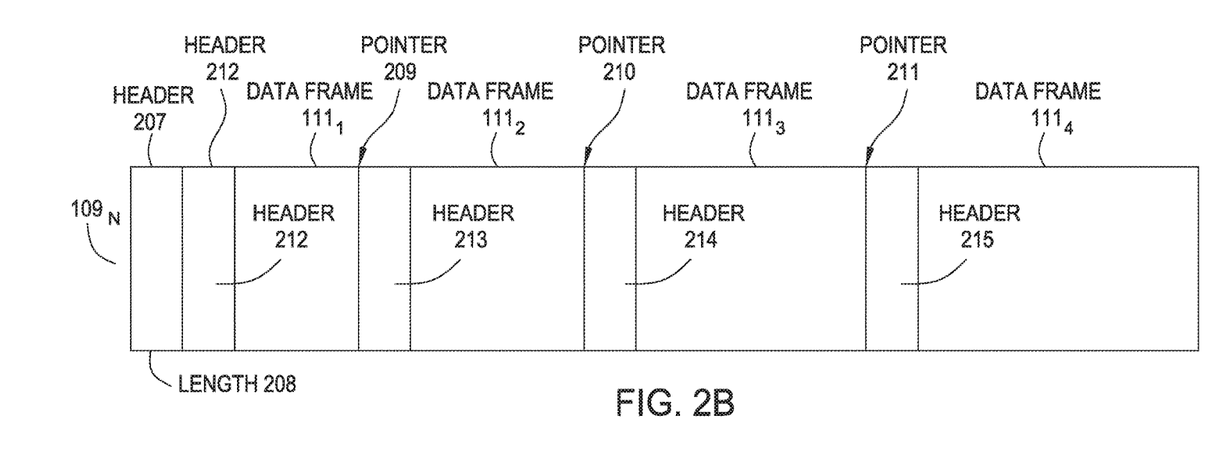

FIG. 2B is a more detailed view of an example optimized data frame $109_N$ from FIG. 1, according to one embodiment. As shown, the example optimized data frame $109_N$ includes a header 207, which is the header of the optimized data frame $109_N$, and includes a length value 208 that specifies the length of the optimized data frame $109_N$. The length value 208 is based on the lengths of each data frame $111_{1-4}$ that make up the optimized data frame $109_N$. As shown, each data frame $111_{1-4}$ includes a respective header 212-213. The example optimized data frame $109_N$ reflects an embodiment where the data frames $111_{1-4}$ have variable lengths. Therefore, the optimized data frame $109_N$ includes pointers 209-211 which mark the start of each data frame $111_{1-4}$, respectively, in the optimized data frame $109_N$. Doing so allows a recipient device driver 107 to extract the data frames $111_{1-4}$ from the optimized data frame $109_N$.

Figure 3:
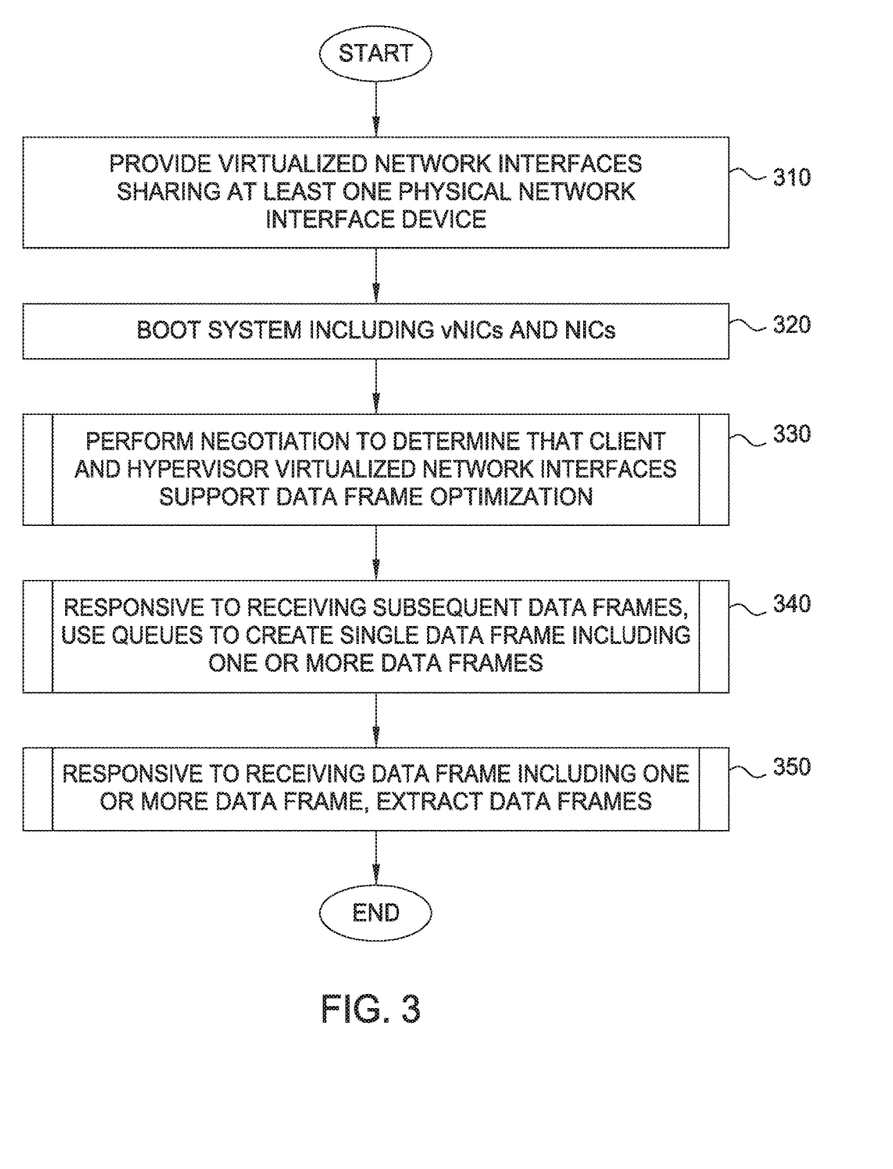
FIG. 3 is a flow chart illustrating an example method to provide router-based maximum transmission unit and data frame optimization in virtualized environments, according to one embodiment.

FIG. 3 is a flow chart illustrating an example method 300 to provide router-based maximum transmission unit and packet optimization in virtualized environments, according to one embodiment. As shown, the method 300 begins at block 310, where a plurality of vNICs $105_{1-N}$ sharing at least one NIC 103 are provided in a computing system. At block 320, the system is booted, including the vNICs $105_{1-N}$ and the NIC 103. At block 330, described in greater detail with reference to FIG. 4, the device drivers 107 of the vNICs $105_{1-N}$ perform negotiation to determine whether the client (e.g., the device driver 107 of the virtual machine $106_{1-N}$) and the device driver 107 of the hypervisor 102 support data frame optimization via the optimized data frames $109_{1-N}$. If the device drivers 107 of the client virtual machines 106 and hypervisor 102 do not support data frame optimization, then traditional data frame processing continues. Otherwise, the device drivers 107 create the queues 108 and store an indication of the MTU for each virtual machine $106_{1-N}$ to process subsequent data frames $110_{1-N}$, $111_{1-N}$ using the MTUs and the queues 108.

At block 340, described in greater detail with reference to FIG. 5, the device drivers 107 of the hypervisor 102 and/or the vNICs 105 process data frames $110_{1-N}$, $111_{1-N}$ using the queues 108 to create optimized data frames $109_{1-N}$ that include one or more of the data frames $110_{1-N}$, $111_{1-N}$. Generally, instead of immediately (and serially) sending data frames $110_{1-N}$, $111_{1-N}$ as they are received, the device drivers 107 leverage the queues 108 to send more of the data frames $110_{1-N}$, $111_{1-N}$ in a given send operation. Doing so improves the functionality of the computing system by freeing the processor to perform other useful tasks. At block 350, described in greater detail with reference to FIG. 6, the device drivers 107 receive one or more optimized data frames $109_{1-N}$, and extract the constituent data frames $110_{1-N}$, $111_{1-N}$ therefrom.

Figure 4:
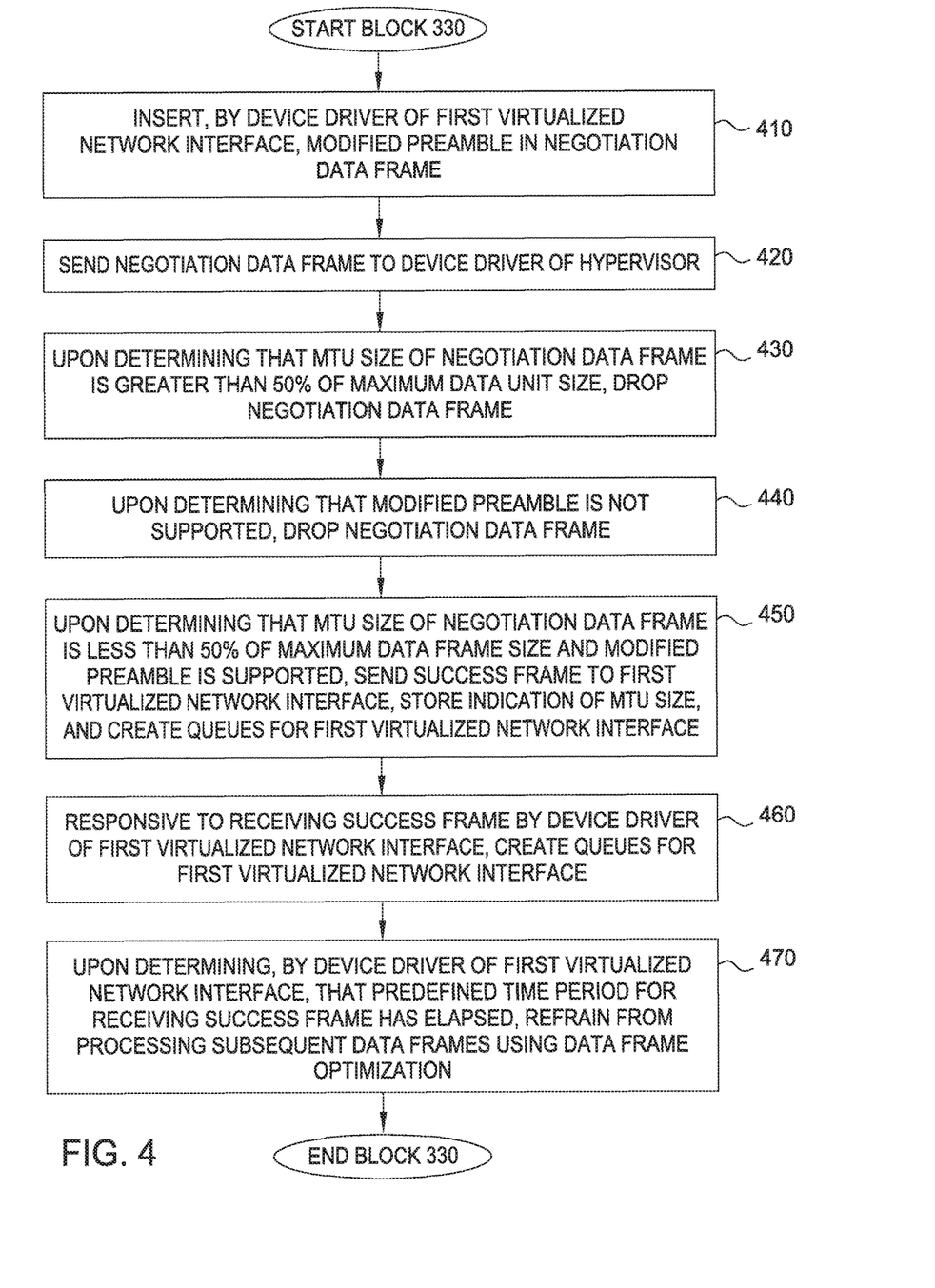
FIG. 4 is a flow chart illustrating an example method to perform negotiation to determine that virtualized network interfaces support data frame optimization, according to one embodiment.

FIG. 4 is a flow chart illustrating an example method 400 corresponding to block 330 to perform negotiation to determine that virtualized network interfaces support packet optimization, according to one embodiment. Although the method 400 is described from the perspective of the device driver 107 of the vNIC 105 of the virtual machines $106_{1-N}$ as initiating the negotiation process, the device driver 107 of the hypervisor 102 may also initiate the negotiation process using the steps of the method 400. As shown, the method 400 begins at block 410, where the device driver 107 of a first vNIC $105_{1-N}$ inserts a modified Ethernet preamble in as the preamble of a negotiation data frame. The standard Ethernet preamble is "10101010 10101010 10101010 10101010 10101010 10101010 10101010 10101011", and as such, the device drivers 107 use the modified preamble as an indication that the corresponding vNICs $105_{1-N}$ support the optimized data frames $109_{1-N}$. In one embodiment, the device drivers 107 use "10011001 10011001 10011001 10011001 10011001 10011001 10011001 10010011" as the modified Ethernet preamble.

At block 420, the device driver 107 of the first vNIC $105_{1-N}$ sends the negotiation data frame to the device driver 107 of the hypervisor 102. The device driver 107 of the hypervisor 102 may then examine the negotiation data frame, including the preamble, the MAC address of the sender, and the sender MTU specified in the negotiation data frame. At block 430, the device driver 107 of the hypervisor 102 drops the negotiation data frame upon determining that the MTU size of the negotiation data frame is greater than 50% of the maximum data frame size supported by the hypervisor 102. For example, if the maximum data frame size of supported by the hypervisor 102 is 64 KB, and the MTU size of the negotiation frame is 40 KB, then the device driver 107 of the hypervisor 102 drops the negotiation data frame, as multiple data frames $110_{1-N}$, $111_{1-N}$ cannot be bundled into a single optimized data frame $109_{1-N}$. At block 440, the device driver 107 of the hypervisor 102 drops the negotiation data frame upon determining that the modified Ethernet preamble in the negotiation data frame is not supported. At block 450, the device driver 107 of the hypervisor 102 sends a success data frame to the requesting device driver 107 of the first vNIC $105_{1-N}$ upon determining that the MTU size of the negotiation data frame is supported and the modified preamble of the negotiation data frame is supported. Additionally, at block 450, the device driver 107 of the hypervisor 102 creates a send queue 108 and a receive queue 108 for the first vNIC $105_{1-N}$, which are associated with the MAC address of the first vNIC $105_{1-N}$. Further still, the device driver 107 of the hypervisor 102 stores an indication of the MTU size of the first vNIC $105_{1-N}$, which again may be associated with the MAC address of the first vNIC $105_{1-N}$.

At block 460, the device driver 107 of the first vNIC $105_{1-N}$ receives the success frame from the hypervisor 102. Responsive to receiving the success frame, the device driver 107 of the first vNIC $105_{1-N}$ creates a send queue 108 and a receive queue 108 for the first vNIC $105_{1-N}$. At block 470, the device driver 107 of the first vNIC $105_{1-N}$ refrains from processing subsequent data frames using data frame optimization (e.g., the optimized data frames $109_{1-N}$) upon determining that a predefined time period for receiving the success frame from the hypervisor 102 has elapsed.

Figure 5:
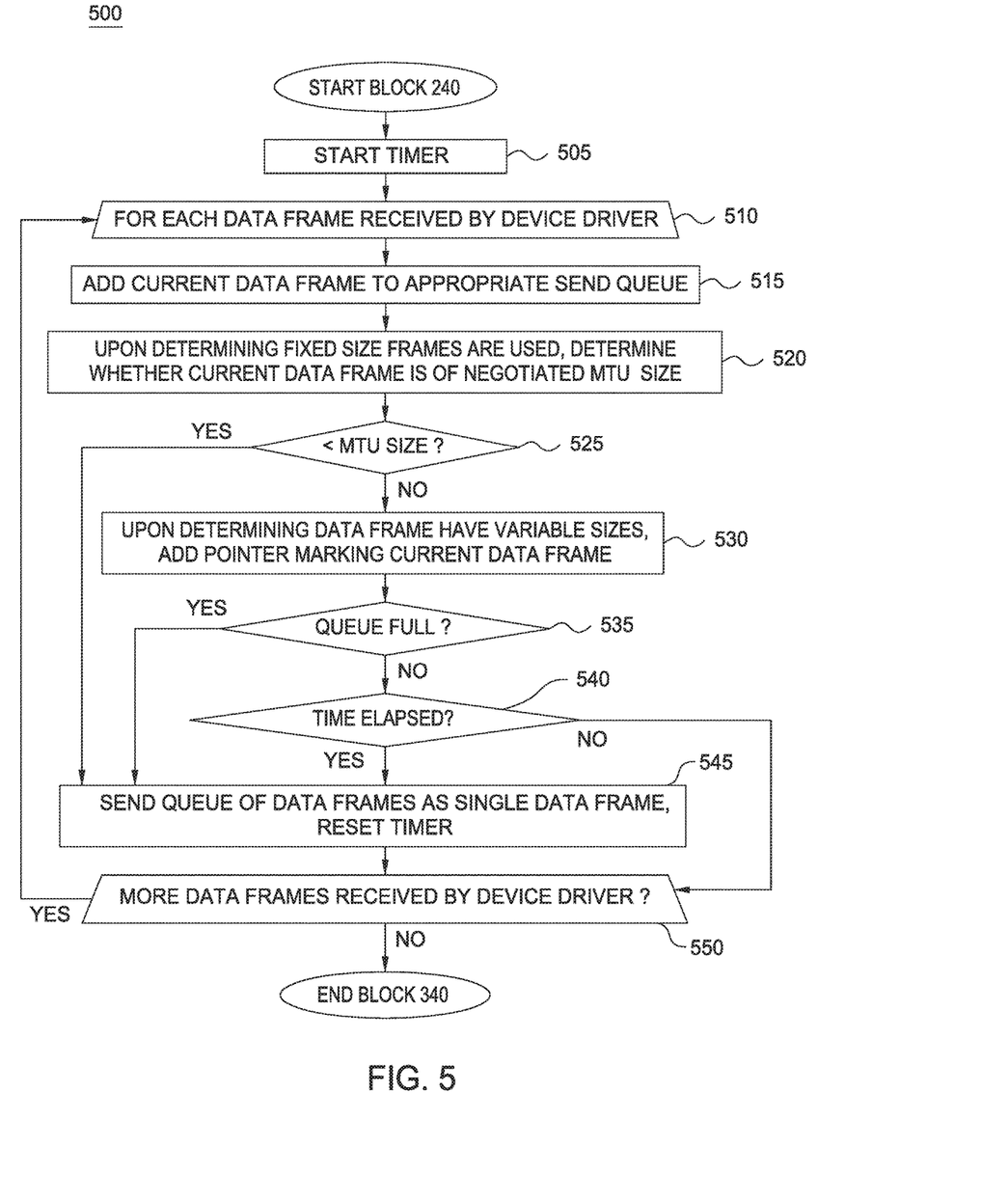
FIG. 5 is a flow chart illustrating an example method to use send queues to create a single data frame including one or more data frames, according to one embodiment.

FIG. 5 is a flow chart illustrating an example method 500 corresponding to block 340 to use the queues 108 to create an optimized data frame $109_{1-N}$ including one or more data frames $110_{1-N}$, $111_{1-N}$, according to one embodiment. Generally, the device driver 107 of the hypervisor 102 and/or the virtual machines $106_{1-N}$ are configured to implement the method 500 to use the queues 108 to create an optimized data frame $109_{1-N}$ including one or more data frames $110_{1-N}$, $111_{1-N}$. However, when implemented by the device driver 107 of the hypervisor 102, the device driver 107 executes the method 500 for each virtual machine $106_{1-N}$ that has successfully negotiated the capability to use the optimized data frames $109_{1-N}$ (and therefore has a respective set of queues 108 stored in the device driver 107 of the hypervisor 102). Similarly, each device driver 107 of each vNIC $105_{1-N}$ executes the method 500 to send/receive optimized data frames $109_{1-N}$. The method 500 will be discussed from the perspective of the device driver 107 of one vNIC $105_{1-N}$ for the sake of clarity.

As shown, the method 500 begins at block 505, where the device driver 107 of the vNIC $105_{1-N}$ starts a timer. At block 510, the device driver 107 of the vNIC $105_{1-N}$ receives at least one data frame $110_{1-N}$, $111_{1-N}$, and executes a loop including blocks 515-550 for each received data frame $110_{1-N}$, $111_{1-N}$. At block 515, the device driver 107 of the vNIC $105_{1-N}$ adds the current data frame $110_{1-N}$, $111_{1-N}$ to the send queue 108 of the vNIC $105_{1-N}$. At block 520, the device driver 107 of the vNIC $105_{1-N}$, upon determining that fixed-size data frames $110_{1-N}$, $111_{1-N}$ are used, determines whether the current frame size is equal to the MTU size for the corresponding vNIC $105_{1-N}$. At block 525, if the device driver 107 of the vNIC $105_{1-N}$ determines that the size of the current data frame $110_{1-N}$, $111_{1-N}$ is less than the MTU size of the vNIC $105_{1-N}$, the method proceeds to block 545. If the size of the current data frame $110_{1-N}$, $111_{1-N}$ is greater than or equal to the MTU size of the vNIC $105_{1-N}$, the method proceeds to block 530, the device driver 107 of the vNIC $105_{1-N}$, upon determining that the data frames $110_{1-N}$, $111_{1-N}$ have variable-size lengths, adds a pointer to the corresponding queue 108 (and/or the optimized data frame $109_{1-N}$) marking the current data frame. For example, if the current data frame $110_{1-N}$, $111_{1-N}$ is 2000 bytes, the device driver 107 of the vNIC $105_{1-N}$ would add a marker (or pointer) at byte 2030 of the optimized data frame $109_{1-N}$, where the additional 30 bytes account for the header of the optimized data frame $109_{1-N}$.

At block 535, the device driver 107 of the vNIC $105_{1-N}$ determines whether the send queue 108 is full. If the queue 108 is full, the method proceeds to block 545. If the queue 108 is not full, the method proceeds to block 540, where the device driver 107 of the vNIC $105_{1-N}$ determines whether the timer has elapsed (e.g., the maximum time threshold has elapsed). If the time threshold has not elapsed, the method proceeds to block 550. If the time threshold has elapsed, the device driver 107 of the vNIC $105_{1-N}$ will send the optimized data frame $109_{1-N}$ even though the queue is not full, and proceeds to block 545. At block 545, the device driver 107 of the vNIC $105_{1-N}$ sends the queue 108 of data frames $110_{1-N}$, $111_{1-N}$ as a single data frame (e.g., the optimized data frame $109_{1-N}$), and resets the timer. The optimized data frame $109_{1-N}$ includes the modified Ethernet preamble. At block 550, the device driver 107 of the vNIC $105_{1-N}$ determines whether more data frames have been received by the device driver 107 of the vNIC $105_{1-N}$. If more data frames $110_{1-N}$, $111_{1-N}$ are received, the method returns to block 510. Otherwise, the method 500 ends.

Figure 6:
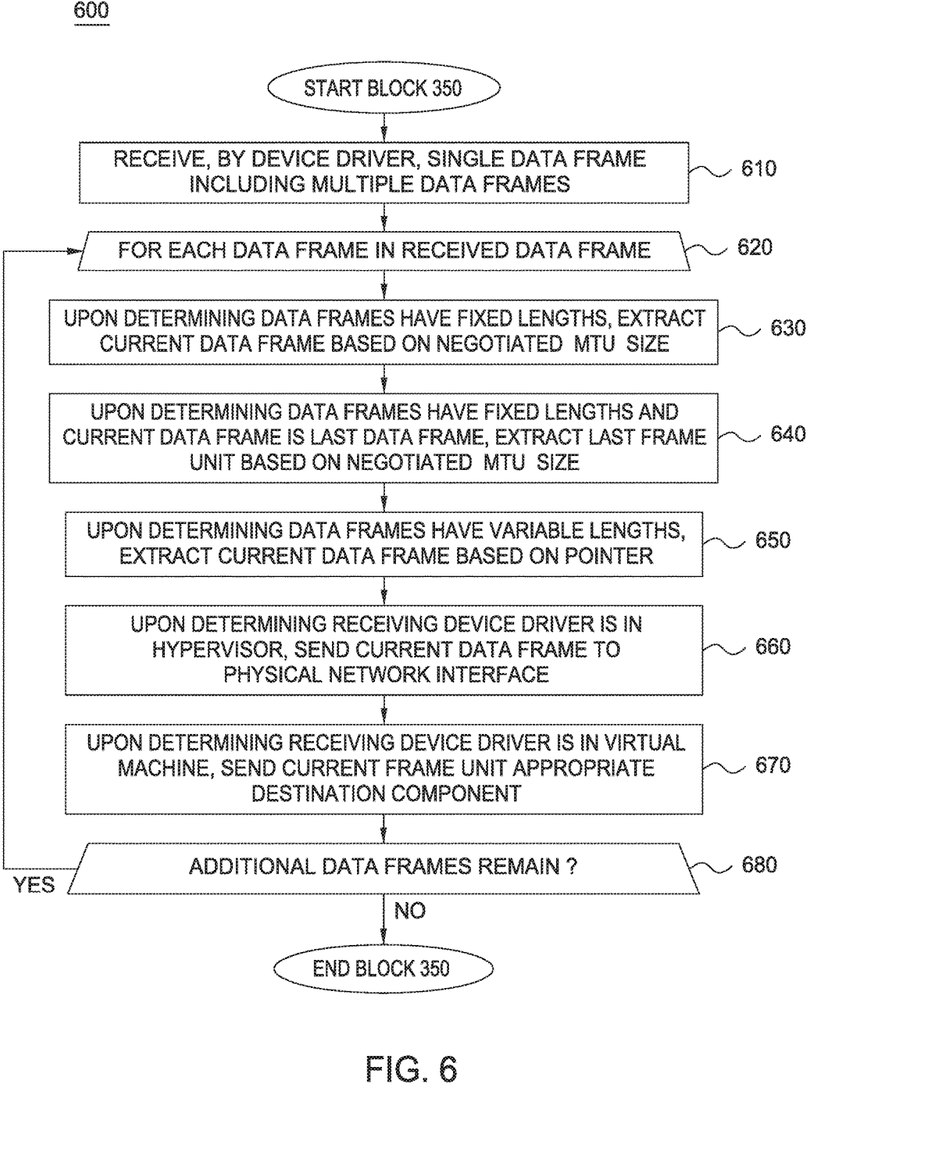
FIG. 6 is a flow chart illustrating an example method to extract data frames from a data frame which includes one or more data frames, according to one embodiment.

FIG. 6 is a flow chart illustrating an example method 600 corresponding to block 350 to extract data frames $110_{1-N}$, $111_{1-N}$ from an optimized data frame $109_{1-N}$, according to one embodiment. Generally, the device driver 107 of the vNICs $105_{1-N}$ and/or the hypervisor 102 may implement some or all of the method 600 to process received optimized data frames $109_{1-N}$. As shown, the method 600 begins at block 610, where the device driver 107 of the vNICs $105_{1-N}$ and/or the hypervisor 102 receives an optimized data frame $109_{1-N}$ which includes two or more data frames $110_{1-N}$, $111_{1-N}$. At block 620, the device driver 107 of the vNICs $105_{1-N}$ and/or the hypervisor 102 executes a loop including blocks 630-680 for each data frame $110_{1-N}$, $111_{1-N}$ in the optimized data frame $109_{1-N}$ received at block 610. At block 630, upon determining the data frames $110_{1-N}$, $111_{1-N}$ have fixed lengths, the receiving device driver 107 of the vNICs $105_{1-N}$ and/or the hypervisor 102 extracts the current data frame based on the negotiated MTU size for the corresponding vNIC $105_{1-N}$. For example, if the MTU size for vNIC $105_1$ is 1500 bytes, the device driver 107 would extract data frames at 1500 byte intervals (starting at byte 30 of the optimized data frame $109_{1-N}$).

At block 640, upon determining that the data frames $110_{1-N}$, $111_{1-N}$ have fixed lengths and that the current data frame $110_{1-N}$, $111_{1-N}$ is the last data frame in the received optimized data frame $109_{1-N}$, the device driver 107 of the vNICs $105_{1-N}$ and/or the hypervisor 102 extract the current data frame $110_{1-N}$, $111_{1-N}$ based on the negotiated MTU size. As previously indicated, by knowing the MTU of fixed-length data frames $110_{1-N}$, $111_{1-N}$ in the optimized data frame $109_{1-N}$, the device driver 107 can compute the length of the last data frame $110_{1-N}$, $111_{1-N}$ by the equation: size of frame $109_{1-N}$-(x-1 packets*MTU size).

At block 650, upon determining the data frames $110_{1-N}$, $111_{1-N}$ have variable lengths, the device driver 107 of the vNICs $105_{1-N}$ and/or the hypervisor 102 extract the current data frame $110_{1-N}$, $111_{1-N}$ by identifying the next pointer in the optimized data frame $109_{1-N}$ marking each data frame $110_{1-N}$, $111_{1-N}$ in the optimized data frame $109_{1-N}$. At block 660, upon determining that the device driver 107 of the hypervisor 102 is the recipient of the optimized data frame $109_{1-N}$ received at block 610, the device driver 107 sends the current data frame $110_{1-N}$, $111_{1-N}$ to the physical NIC 103 for transmission. At block 670, upon determining the device driver 107 of the vNICs $105_{1-N}$ is the recipient of the optimized data frame $109_{1-N}$ received at block 610, the device driver 107 sends the current data frame $110_{1-N}$, $111_{1-N}$ to the appropriate destination component (e.g., an operating system and/or application of the corresponding virtual machine $106_{1-N}$). At block 680, the device driver 107 of the vNICs $105_{1-N}$ and/or the hypervisor 102 determines whether more data frames $110_{1-N}$, $111_{1-N}$ remain in the optimized data frame $109_{1-N}$ received at block 610. If more data frames $110_{1-N}$, $111_{1-N}$ remain, the method returns to block 620. Otherwise, the method 600 ends.

Figure 7:
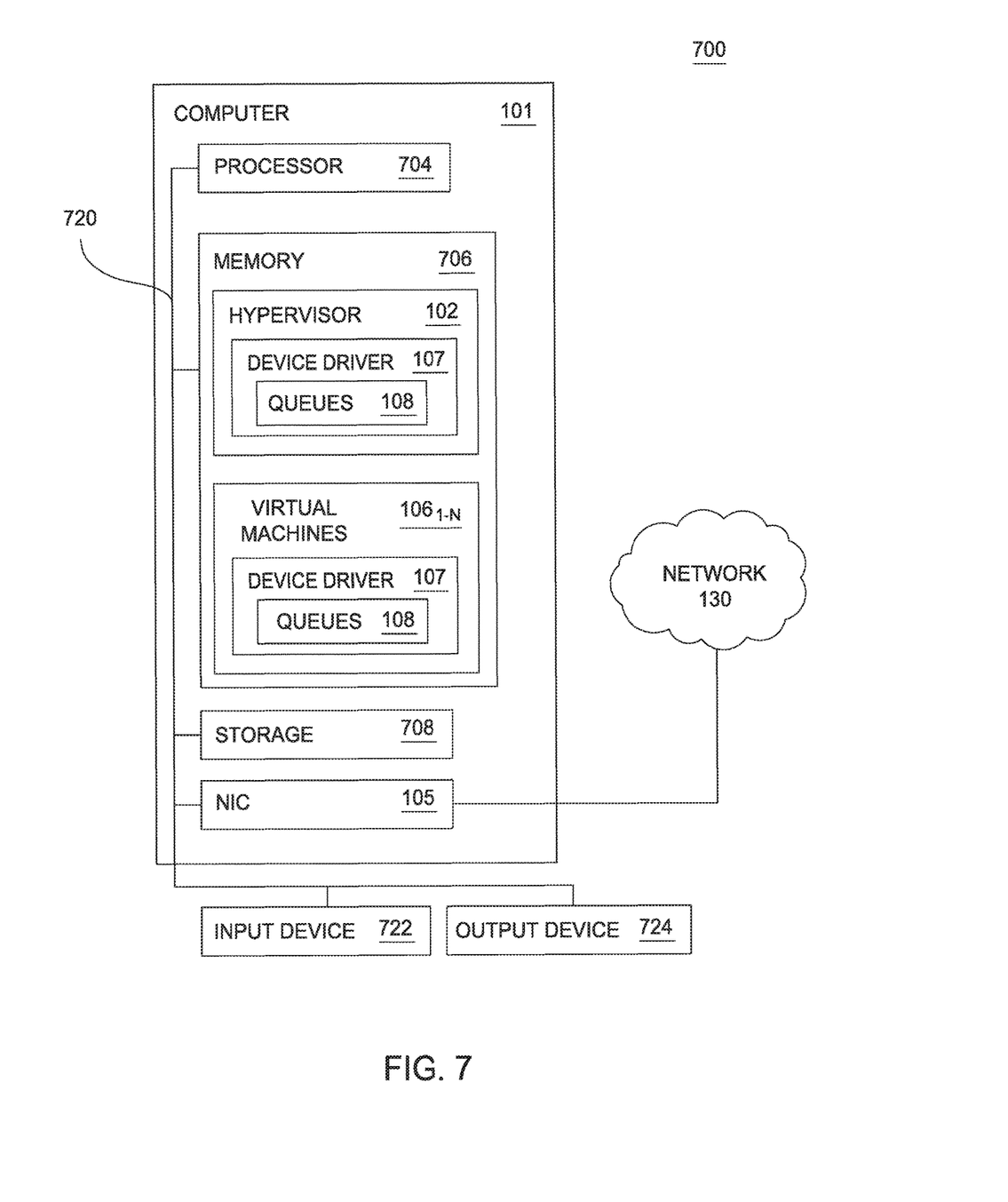
FIG. 7 illustrates an example system which provides router-based maximum transmission unit and frame optimization in virtualized environments, according to one embodiment.

FIG. 7 illustrates an example system 700 which provides router-based maximum transmission unit and data frame optimization in virtualized environments, according to one embodiment. The networked system 700 includes the computing system 101. The computing system 101 may also be connected to other computers via a network 130. In general, the network 130 may be a telecommunications network and/or a wide area network (WAN). In a particular embodiment, the network 130 is the Internet.

The computing system 101 generally includes a processor 704 which obtains instructions and data via a bus 720 from a memory 706 and/or a storage 708. The computing system 101 may also include one or more network interface devices 105, input devices 722, and output devices 724 connected to the bus 720. The computing system 101 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computing system 101 to communicate with other computers via the network 130.

The storage 708 is representative of hard-disk drives, solid state drives, flash memory devices, optical media and the like. Generally, the storage 708 stores application programs and data for use by the computing system 101. In addition, the memory 706 and the storage 708 may be considered to include memory physically located elsewhere; for example, on another computer coupled to the computing system 101 via the bus 720.

The input device 722 may be any device for providing input to the computer 101. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computing system 101. The output device 724 may include output devices such as monitors, touch screen displays, and so on.

As shown, the memory 706 contains the hypervisor 102, which includes the device driver 107 and the queues 108. The memory 706 also includes the virtual machines $106_{1-N}$, which also include the device driver 107 and queues 108. Generally, the computing system 101 is configured to implement all functionality described herein.

Advantageously, embodiments disclosed herein provide techniques to optimize the transfer of data frames between virtual machines and a hypervisor in a virtualized computing environment. Rather than send each frame serially as they arrive, embodiments disclosed herein package multiple frames together, which are then sent intact in their entirety encapsulated in a larger data frame (e.g., the largest data frame supported by the hypervisor). Doing so saves system resources. By providing the functionality disclosed herein in device drivers, applications and other internal or external system and network components are not aware of any changes, and need not be reconfigured.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving a first data frame and a second data frame by a device driver of a first virtual network interface controller (vNIC) of a plurality of vNICs sharing a physical network interface controller (NIC) of a computing system;
   storing, by the device driver of the first vNIC, the first and second data frames in a first queue for the first vNIC;
   generating, by the device driver of the first vNIC, an optimized data frame comprising the first and second data frames, wherein the optimized data frame specifies a modified Ethernet preamble; and
   sending the optimized data frame to a hypervisor of the computing system.

2. The method of claim 1, further comprising prior to receiving the first and second data frames:
   receiving, by a device driver of the hypervisor from the device driver of the first vNIC, a negotiation packet specifying: (i) the modified Ethernet preamble, (ii) a media access control (MAC) address of the first vNIC, and (iii) a maximum transmission unit (MTU) of the first vNIC; and
   upon determining that the modified preamble is supported by the device driver of the hypervisor and the MTU of the first vNIC is not greater than half of a maximum frame size supported by the hypervisor:
      creating, by the device driver of the hypervisor, a send queue and a receive queue for the first vNIC in the device driver of the hypervisor;
      associating the send and receive queues for the first vNIC in the device driver of the hypervisor with the MTU and MAC address of the first vNIC; and
      sending, by the device driver of the hypervisor, a success frame to the device driver of the first vNIC.

3. The method of claim 2, further comprising:
   responsive to receiving the success frame by the device driver of the first vNIC, creating, by the device driver of the first vNIC, the first queue for the first vNIC.

4. The method of claim 1, wherein the optimized data frame is generated upon determining at least one of: (i) that the first queue is full, and (ii) a timer value of a timer started by the device driver of the first vNIC prior to receiving the first and second data frames exceeds a maximum time threshold.

5. The method of claim 1, further comprising:
   receiving, by a device driver of the hypervisor, the optimized data frame;
   extracting, by the device driver of the hypervisor, the first data frame from the optimized data frame; and
   providing, by the device driver of the hypervisor, the first data frame to the hypervisor; and
   forwarding the first data frame via the physical NIC.

6. The method of claim 1, wherein the first vNIC processes data frames of a fixed length, wherein the second data frame is of a length smaller than an maximum transmission unit (MTU) of the first vNIC, wherein the optimized data frame is generated and sent to the hypervisor upon determining that the length of the second data frame is less than the MTU of the first vNIC.

7. The method of claim 1, further comprising:
   receiving, by the hypervisor via the physical NIC, a third data frame and a fourth data frame specifying the first vNIC as a destination;
   storing, by the device driver of the hypervisor, the third and fourth data frames in a second queue for the first vNIC; and
   upon determining, by the device driver of the hypervisor, that the second queue for the first vNIC is full:
      generating a second optimized data frame comprising the third and fourth data frames, wherein the second optimized data frame specifies the modified Ethernet preamble; and sending the second optimized data frame to the device driver of the first vNIC.

8. A computer program product, comprising:
a computer-readable storage medium having computer readable program code embodied therewith, the computer readable program code executable by a processor to perform an operation comprising:
receiving a first data frame and a second data frame by a device driver of a first virtual network interface controller (vNIC) of a plurality of vNICs sharing a physical network interface controller (NIC) of a computing system;
storing, by the device driver of the first vNIC, the first and second data frames in a first queue for the first vNIC;
generating, by the device driver of the first vNIC, an optimized data frame comprising the first and second data frames, wherein the optimized data frame specifies a modified Ethernet preamble; and
sending the optimized data frame to a hypervisor of the computing system.

9. The computer program product of claim 8, the operation further comprising prior to receiving the first and second data frames:
receiving, by a device driver of the hypervisor from the device driver of the first vNIC, a negotiation packet specifying: (i) the modified Ethernet preamble, (ii) a media access control (MAC) address of the first vNIC, and (iii) a maximum transmission unit (MTU) of the first vNIC; and
upon determining that the modified preamble is supported by the device driver of the hypervisor and the MTU of the first vNIC is not greater than half of a maximum frame size supported by the hypervisor:
creating, by the device driver of the hypervisor, a send queue and a receive queue for the first vNIC in the device driver of the hypervisor;
associating the send and receive queues for the first vNIC in the device driver of the hypervisor with the MTU and MAC address of the first vNIC; and
sending, by the device driver of the hypervisor, a success frame to the device driver of the first vNIC.

10. The computer program product of claim 9, the operation further comprising:
responsive to receiving the success frame by the device driver of the first vNIC, creating, by the device driver of the first vNIC, the first queue for the first vNIC.

11. The computer program product of claim 8, wherein the optimized data frame is generated upon determining at least one of: (i) that the first queue is full, and (ii) a timer value of a timer started by the device driver of the first vNIC prior to receiving the first and second data frames exceeds a maximum time threshold.

12. The computer program product of claim 8, the operation further comprising:
receiving, by a device driver of the hypervisor, the optimized data frame;
extracting, by the device driver of the hypervisor, the first data frame from the optimized data frame; and
providing, by the device driver of the hypervisor, the first data frame to the hypervisor; and
forwarding the first data frame via the physical NIC.

13. The computer program product of claim 8, wherein the first vNIC processes data frames of a fixed length, wherein the second data frame is of a length smaller than an maximum transmission unit (MTU) of the first vNIC, wherein the optimized data frame is generated and sent to the hypervisor upon determining that the length of the second data frame is less than the MTU of the first vNIC.

14. The computer program product of claim 8, the operation further comprising:
receiving, by the hypervisor via the physical NIC, a third data frame and a fourth data frame specifying the first vNIC as a destination;
storing, by the device driver of the hypervisor, the third and fourth data frames in a second queue for the first vNIC; and
upon determining, by the device driver of the hypervisor, that the second queue for the first vNIC is full:
generating a second optimized data frame comprising the third and fourth data frames, wherein the second optimized data frame specifies the modified Ethernet preamble; and
sending the second optimized data frame to the device driver of the first vNIC.

15. A system, comprising:
a processor; and
a memory storing one or more instructions which, when executed by the processor, performs an operation comprising:
receiving a first data frame and a second data frame by a device driver of a first virtual network interface controller (vNIC) of a plurality of vNICs sharing a physical network interface controller (NIC) of a computing system;
storing, by the device driver of the first vNIC, the first and second data frames in a first queue for the first vNIC;
generating, by the device driver of the first vNIC, an optimized data frame comprising the first and second data frames, wherein the optimized data frame specifies a modified Ethernet preamble; and
sending the optimized data frame to a hypervisor of the computing system.

16. The system of claim 15, the operation further comprising prior to receiving the first and second data frames:
receiving, by a device driver of the hypervisor from the device driver of the first vNIC, a negotiation packet specifying: (i) the modified Ethernet preamble, (ii) a media access control (MAC) address of the first vNIC, and (iii) a maximum transmission unit (MTU) of the first vNIC; and
upon determining that the modified preamble is supported by the device driver of the hypervisor and the MTU of the first vNIC is not greater than half of a maximum frame size supported by the hypervisor:
creating, by the device driver of the hypervisor, a send queue and a receive queue for the first vNIC in the device driver of the hypervisor;
associating the send and receive queues for the first vNIC in the device driver of the hypervisor with the MTU and MAC address of the first vNIC; and
sending, by the device driver of the hypervisor, a success frame to the device driver of the first vNIC.

17. The system of claim 16, the operation further comprising:
responsive to receiving the success frame by the device driver of the first vNIC, creating, by the device driver of the first vNIC, the first queue for the first vNIC.

18. The system of claim 15, wherein the optimized data frame is generated upon determining at least one of: (i) that the first queue is full, and (ii) a timer value of a timer started by the device driver of the first vNIC prior to receiving the first and second data frames exceeds a maximum time threshold.

19. The system of claim 15, the operation further comprising:
receiving, by a device driver of the hypervisor, the optimized data frame;
extracting, by the device driver of the hypervisor, the first data frame from the optimized data frame; and
providing, by the device driver of the hypervisor, the first data frame to the hypervisor; and
forwarding the first data frame via the physical NIC.

20. The system of claim 15, wherein the first vNIC processes data frames of a fixed length, wherein the second data frame is of a length smaller than an maximum transmission unit (MTU) of the first vNIC, wherein the optimized data frame is generated and sent to the hypervisor upon determining that the length of the second data frame is less than the MTU of the first vNIC.

* * * * *